United States Patent
McLin et al.

(10) Patent No.: US 11,773,997 B2
(45) Date of Patent: Oct. 3, 2023

(54) VALVE GATE EUTECTIC LOCK

(71) Applicant: Cameron International Corporation, Houston, TX (US)

(72) Inventors: Jermetris McLin, Katy, TX (US); Mark McGilvray, Jr., Katy, TX (US); Ovidiu Zorca, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 17/441,477

(22) PCT Filed: Apr. 1, 2020

(86) PCT No.: PCT/US2020/026155
§ 371 (c)(1),
(2) Date: Sep. 21, 2021

(87) PCT Pub. No.: WO2020/205958
PCT Pub. Date: Oct. 8, 2020

(65) Prior Publication Data
US 2022/0163127 A1    May 26, 2022

Related U.S. Application Data

(60) Provisional application No. 62/827,815, filed on Apr. 1, 2019.

(51) Int. Cl.
*F16K 17/38*  (2006.01)
*E21B 34/02*  (2006.01)
*F16K 35/00*  (2006.01)

(52) U.S. Cl.
CPC ............ *F16K 17/383* (2013.01); *E21B 34/02* (2013.01); *F16K 35/00* (2013.01); *Y10T 137/1819* (2015.04)

(58) Field of Classification Search
CPC ...... E21B 34/02; E21B 34/063; F16K 17/383; F16K 35/00; F16K 17/38; F16K 17/40;
(Continued)

(56) References Cited

U.S. PATENT DOCUMENTS

| 761,221 A * | 5/1904 | Grinnell ................. A62C 31/02 169/41 |
| 1,365,476 A * | 1/1921 | Fuller ..................... F16K 35/04 251/83 |

(Continued)

FOREIGN PATENT DOCUMENTS

| JP | 51148019 U | 11/1976 |
| JP | 64011482 U | 1/1989 |

OTHER PUBLICATIONS

Darman, R. J. et al., "New Developments in Platform Production Safety Systems", SPE-4325-MS, presented at the SPE European Meeting, London, United Kingdom, 1973, pp. 16 pages.
(Continued)

*Primary Examiner* — Kevin F Murphy
*Assistant Examiner* — Jonathan J Waddy
(74) *Attorney, Agent, or Firm* — Jeffrey D. Frantz (57) ABSTRACT

A valve gate assembly with a eutectic implement configured to degrade in response to a force imparted along a non-parallel load path. The unique architecture employed for various embodiments ensures a non-parallel load path is employed in triggering the shift in position for a valve gate. This enhances the integrity of the eutectic implements such that a wider variety of valve gate assembly dimensions may be utilized. This, in turn, allows for such assemblies to be utilized with larger production line volumes without compromise to safety measures afforded by such safety valves.

20 Claims, 6 Drawing Sheets

(58) Field of Classification Search
CPC ...... F16K 17/403; F16K 17/406; F16K 35/04; F16K 35/06; F16K 35/10; A62C 2/242; A62C 37/12; Y10T 137/1624; Y10T 137/1632; Y10T 137/1639; Y10T 137/1797; Y10T 137/1819; Y10T 137/1827
USPC .................. 137/75, 67, 68.11, 68.12, 70, 72
See application file for complete search history.

(56) References Cited

U.S. PATENT DOCUMENTS

| | | | | |
|---|---|---|---|---|
| 3,838,705 | A * | 10/1974 | Diehl | F16K 17/383 137/75 |
| 4,240,455 | A * | 12/1980 | McGee | F16K 17/383 74/2 |
| 4,245,662 | A * | 1/1981 | McGee | F16K 17/383 137/553 |
| 4,635,670 | A | 1/1987 | Kilmoyer | |
| 4,825,893 | A * | 5/1989 | Gailey | F16K 17/383 251/149.6 |
| 4,827,963 | A * | 5/1989 | Baker | F16K 17/383 251/297 |
| 5,067,510 | A | 11/1991 | Breaux et al. | |
| 5,197,671 | A * | 3/1993 | Wass | F16K 17/383 137/72 |
| 5,213,128 | A * | 5/1993 | Baird | G05D 23/021 137/79 |
| 5,275,194 | A * | 1/1994 | Gray, Jr. | F16K 17/383 251/324 |
| 5,477,877 | A * | 12/1995 | Schulze | A62C 4/02 137/457 |
| 5,495,865 | A * | 3/1996 | Wass | F16K 17/383 251/38 |
| 5,647,390 | A * | 7/1997 | Wass | F16K 17/383 137/68.12 |
| 6,227,226 | B1 | 5/2001 | Green | |
| 8,985,552 | B2 | 3/2015 | Udipi et al. | |
| 2003/0106583 | A1* | 6/2003 | Weng | F16K 17/383 137/72 |
| 2011/0308619 | A1* | 12/2011 | Martino | E21B 34/02 251/65 |
| 2014/0138082 | A1* | 5/2014 | Meyberg | E21B 34/02 166/97.1 |
| 2015/0376986 | A1 | 12/2015 | Taylor et al. | |
| 2021/0404569 | A1* | 12/2021 | Kozma | F16K 31/003 |

OTHER PUBLICATIONS

Gilbert, D. L. et al., "Releasable Fusible Lockopen Device Enhances Emergency Shutdown Capabilities", SPE-22805-MS, presented at the SPE Annual Technical Conference and Exhbition, Dallas, Texas, USA, 1991, pp. 463-468.
Gilbert, D. L. et al., "Safety Initiatives Enhance Integrity of Offshore Platform Operations", SPE-24776-PA, Journal of Petroleum Technology, 1993, 45(5), pp. 478-484.
Hartley, R. et al., "Development of Fire-Resistant Wellhead and Christmas Tree Equipment", SPE-10433-PA, Journal of Petroleum Technology, 1994, 36(1), pp. 89-95.
Ross, C. M. et al., "Current Materials and Devices for Control of Fluid Loss", SPE-54323-MS, presented at the SPE Asia Pacific Oil and Gas Conference and Exhibition, Jakarta, Indonesia, 1999, 16 pages.
International Search Report and Written Opinion issued in PCT Application PCT/US2020/026155, dated Jul. 29, 2020 (12 pages).

* cited by examiner

VALVE GATE EUTECTIC LOCK

CROSS-REFERENCE TO RELATED APPLICATION

The present document is based on and claims priority to U.S. Provisional Application Ser. No. 62/827,815, filed Apr. 1, 2019, which is incorporated herein by reference in its entirety.

BACKGROUND

Exploring, drilling, completing, and operating hydrocarbon and other wells are generally complicated, time consuming and ultimately very expensive endeavors. In recognition of these expenses, added emphasis has been placed on well access, monitoring and management throughout the productive life of the well. That is to say, from a cost standpoint, an increased focus on ready access to well information and/or more efficient interventions have played key roles in maximizing overall returns from the completed well.

By the same token, added emphasis on operator safety may also play a critical role in maximizing returns. For example, ensuring safety over the course of various offshore operations may also ultimately improve returns. As such, a blowout preventor (BOP), subsurface safety valve, and other safety features are generally incorporated into hardware of the wellhead at the seabed. The same type of thinking is employed for surface operations where an emergency gate or "shut off" valve is generally located at a production tree near the wellhead. In either case, production and pressure related hazards may be dealt with by an automated and reliable sealing off of production right at a local production location in the case of an emergent circumstance.

For example, surface production equipment generally includes a gate valve capable of shutting off all production in the vicinity of the tree and other well control equipment at the wellhead. Thus, in the emergent circumstance of a fire, the gate valve may automatically shut in order to close off all production fluids. In this way, the extremely hazardous situation of a fire further fed by a constant flow of hydrocarbons from a well may be avoided.

A surface gate valve generally operates by way of positioning the gate within production tubing by way of an actuator that is secured over the tubing. More specifically, for a "normally closed" reverse acting gate valve, the actuator is used to advance the gate into the flow path of the production tubing. This advancement of the gate locates an orifice of the gate in a central position of the flow path to allow production flow. In order to advance the gate into position as indicated, a spring or other resistant force is overcome within the actuator. A piston of the actuator which is used to compress the spring and advance the gate into position may be locked in place to allow continued production flow. This is the general set up of a reverse acting gate valve. Of course, the assembly may be reconfigured such that advancement of the gate is employed to shut off production flow. In either case, overcoming a spring or other resistant force is utilized to attain the open flow position of the gate.

The locked open gate valve described above may automatically shut whenever the lock is defeated. So, for example, in the example of spring resistant force described here, defeating the lock means that the spring is allowed to naturally expand and close the gate. One effective lock that is commonly utilized in keeping the gate open is a eutectic lock. A eutectic lock is one that is configured of a material that is intentionally tailored to fail upon exposure to extreme heat. Thus, should a fire emerge and heat rise in the vicinity of the wellhead, the eutectic lock may fail and allow the gate to automatically close.

The concept of a failing eutectic lock is well suited for circumstances as described above, at least in theory. Unfortunately, the ability of eutectic material to serve the noted function is limited. That is, in order for the above described gate valve to reliably operate and reliably shut-off in emergent circumstances, the architecture of the assembly is tailored to fairly strict dimensional limitations. This is because the eutectic materials which are utilized to keep the piston in the locked open position are of limited structural reliability. Thus, during operation, it is important that the eutectic lock not face an amount of resistive force sufficient to effect premature failure.

The architecture of the eutectic lock is generally in the form of threading that is found within the housing of the actuator which houses the piston for driving the position of the gate as discussed above. So, for example, a stem that emerges from the housing may be rotated so as to move the noted piston within the housing as it threadably rotates and interacts with the threading that is the eutectic lock. From a dimensional standpoint, this means that the narrower the overall assembly is, the more effective the lock. For example, consider the strength of long narrow passage of eutectic threading verses a shorter wider passage utilizing the same threading. The latter would be more prone to premature failure in the face of constant axial spring forces from below which run directly parallel to the threaded eutectic weakpoint that constitutes the lock.

This eutectic lock limitation translates into a limitation on the overall assembly. That is, the need to keep the lock of limited dimensions means that the gate, spring and other portions of the valve assembly should also be of correspondingly limited dimensions. As a practical matter this also limits the production flow itself. In other words, the production tubing is kept to a minimum in order to allow the gate to effectively work at this portion of the production tubing. Ultimately, this means that operator choices are limited when it comes to production tubing sizing and overall production options.

SUMMARY

A valve assembly with a valve gate to govern fluid flow through a flowline. The assembly includes an actuator within a housing adjacent the flowline to determine the position of the gate and thus, the fluid flow. A eutectic locking mechanism may be utilized to hold the actuator in a position that allows the fluid flow to proceed through the flowline. However, failure of the eutectic locking mechanism may lead to blocking of the flow. Furthermore, such failure may be responsive to a predominantly non-parallel load on the actuator. This non-parallel load may be a substantially perpendicular load relative the eutectic locking mechanism.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain onshore or surface oilfield applications. For example, a conventional Christmas tree at a wellhead positioned at an oilfield surface is illustrated. Specifically, a production line emerging from the tree and wellhead equipment is outfitted with a gate valve assembly having unique features for automatic shut down of production in the face of hazardous emergent conditions. However, the assembly may be located at various locations, particularly where the hazardous condition is prone to display extreme heat. This may include offshore operations and a variety of other environments even outside of the oilfield. Regardless, so long as the assembly includes a eutectic locking mechanism that is responsive to a predominantly non-axial load, appreciable benefits may be realized.

Figure 1:
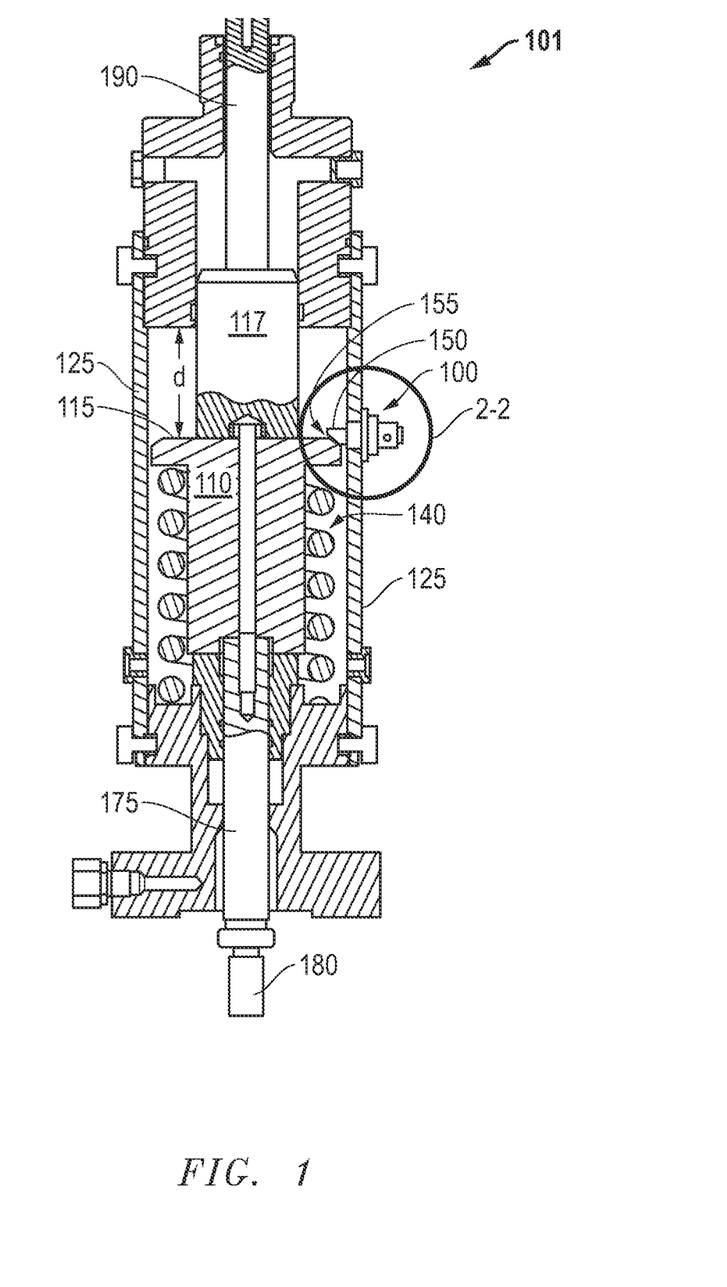
FIG. 1 is a side cross-sectional view of an embodiment of a gate valve assembly with a eutectic lock responsive to a non-axial load trigger.

Referring now to FIG. 1, a side cross-sectional view of an embodiment of a gate valve assembly 101 is illustrated. The assembly 101 employs a eutectic lock 100 that is responsive to a non-axial or non-linear load actuator or trigger. For example, in the embodiment illustrated, axial force supplied by a spring 140 may be directed in a vertical or an axial direction. The head 115 of a piston 110 pushed downward onto the spring 140 may charge this load. An extension 150 of the lock 100 may be utilized to physically retain the head 115 at an interface 155. Thus, the piston 110 and spring 140 may be held in place as illustrated. As will be discussed below, this extension 150 is of a non-eutectic material such as stainless steel. However, the position of the extension 150 is determined by a eutectic implement which may be overcome under certain circumstances. When this occurs, the extension 150 may be withdrawn away from the piston 110, such that the spring 140 is allowed to force the piston 110 in an upward direction. As also discussed below, this upward movement may change the position of a gate within a production hub 360, thereby automatically closing off a flow of production within production tubing 375 at an oilfield 300 (see FIG. 3).

Returning to the illustration of FIG. 1, notice the substantially perpendicular orientation of the extension 150 as compared to the predominantly vertical, upward axial load of the spring 140. Further, as discussed below, for the embodiment illustrated, the eutectic implement is adjacently behind the extension 150 and not in direct contact with the piston 110 (e.g. see retainer 201 of FIG. 2A). This perpendicular translation of the load to the implement is a result of the extension 150 and the lock 100 being located through the housing 125 about the piston 110 which defines the operational space. As a result, in order to defeat the mechanical impediment of the implement, a substantially non-parallel force or load of the spring 140 and piston 110 is applied to the extension 150. This is in contrast to a circumstance in which the resistance of an impediment might similarly be axial and parallel to the force supplied by the spring 140. So, for example, where the impediment is limited to teeth, threading or other features located at the inner surface of the housing 125, the resistance to the upward force of the spring 140 is parallel. However, in the embodiment illustrated, a lock 100 with features that run through the side of the housing 125 and emerge perpendicular to the axial load provide unique advantages.

A perpendicular or non-parallel orientation of the lock 100 and extension 150 relative the axial load of the spring 140 means that the load imparted on the implement behind the extension 150 is indirect. As a result, the capability of the extension 150 to retain the piston 110 in place is enhanced. This is particularly the case where a plurality of locks 100 are utilized at a given circumferential location about the housing 125. For example, while only one lock 100 is illustrated, in one embodiment, anywhere from 2-10 locks 100 may be utilized as described. Ultimately, this means that locking of the piston 110 and spring 140 in place may be regulated with a greater degree of precision. That is, rather than employing a eutectic lock with limited retention capability in the face of a substantially parallel axial load, tighter tailoring of an unlocking profile may be developed. A non-parallel load on the extension 150 means that the responsiveness is less easily triggered by the upward axial load of the spring 140. Simply put, a greater amount of weakness in the eutectic material will be required to attain the failure mode of the extension 150. This means that dimensional options may be expanded in terms of the size of the assembly 101, the piston 110, the size and force of the spring 140 and so forth.

Defeating the lock 100 by way of a non-parallel load applied through the extension 150 opens up dimensional options for the operator. Specifically, this allows for the practical implementation of larger assemblies 101 and thus larger production tubing 375 and volumes (see FIG. 3). As a result, operators may be less limited in the volume of production that may be produced while still having an effective and reliable gate valve assembly 101 in place.

Figure 3:
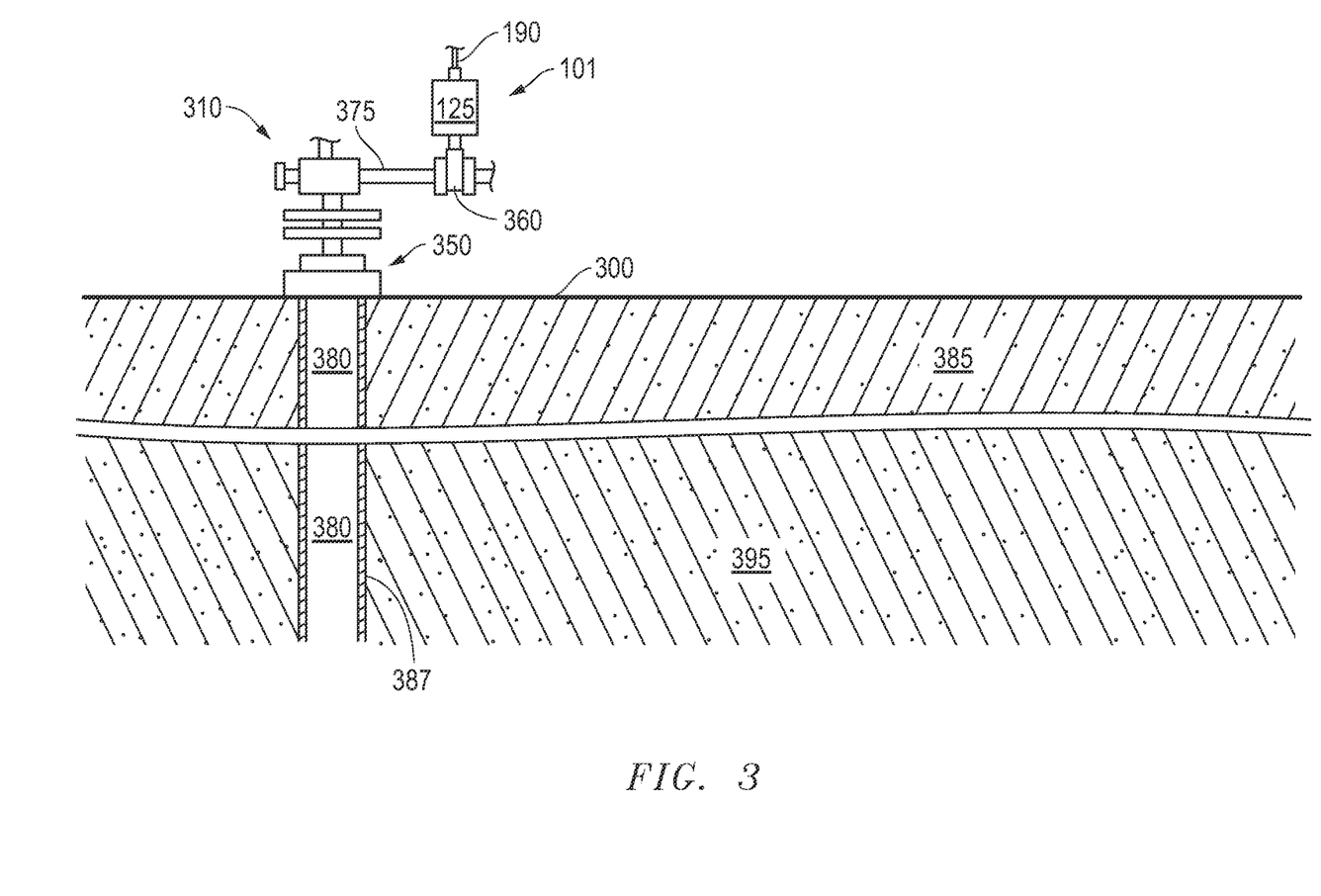
FIG. 3 is an overview of an oilfield employing the gate valve assembly of FIG. 1 to maintain control over production flow at a line running from equipment at a well.

With added reference to FIG. 3, the gate within the production hub 360 that governs the flow of production fluid through the tubing 375 is secured to a gate coupling 180 at a lower stem 175 which is secured to the piston 110. This means that the position of the piston 110 is determinative of gate position and whether or not production through the production tubing 375 may flow. In the embodiment shown, the piston 110 is held back by the lock 100 as described above. More specifically, the piston 110 is compressed downward a predetermined distance (d) within the housing 125 and the lock 100 is set as illustrated. This distance (d) corresponds to locating an orifice of the gate centrally within a channel of the tubing 375 to facilitate production flow.

This configuration of assembly 101, with piston depression corresponding to production flow is generally referred to as a reverse acting gate assembly. A reverse acting gate assembly is considered to be "normally closed" unless the piston 110 is held in a position such as that illustrated in FIG. 1. However, it should be noted that architecture for a direct acting gate assembly or one that might be normally opened could take advantage of the concepts detailed herein. Similarly, in the embodiment shown, the valve assembly 101 is one in which a stem 190 is utilized with a head 117 coupled to the piston 110. This type of configuration may facilitate guidance of the piston 110 and provide one manner for manipulating the position of the piston 110 from an external location. However, it should also be noted that other types of assemblies may take advantage of concepts detailed herein. There is no requirement that the assembly 101 include valve stem architecture.

Figure 2A:
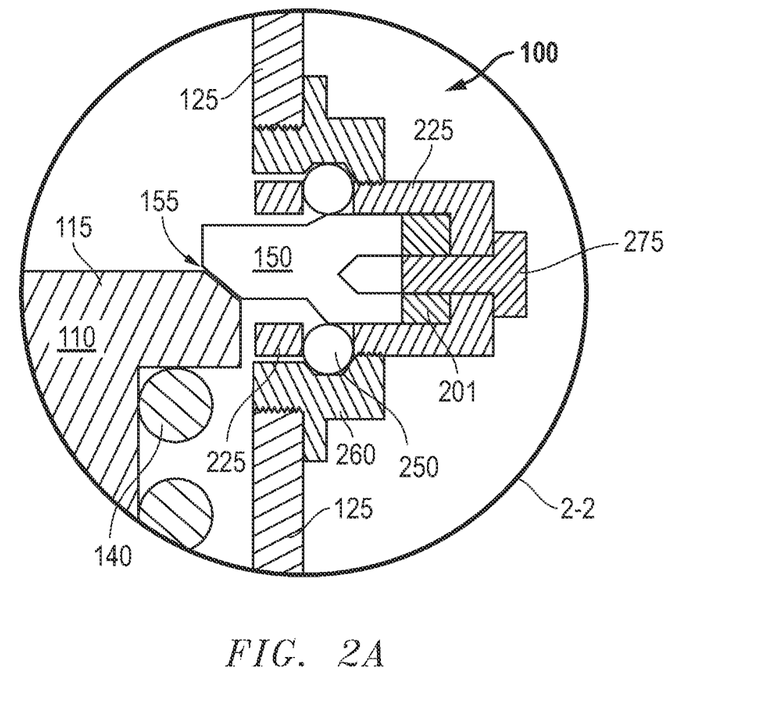
FIG. 2A is an enlarged view of the eutectic lock of the assembly taken from 2-2 of FIG. 1 with the lock engaged.
Figure 2B:
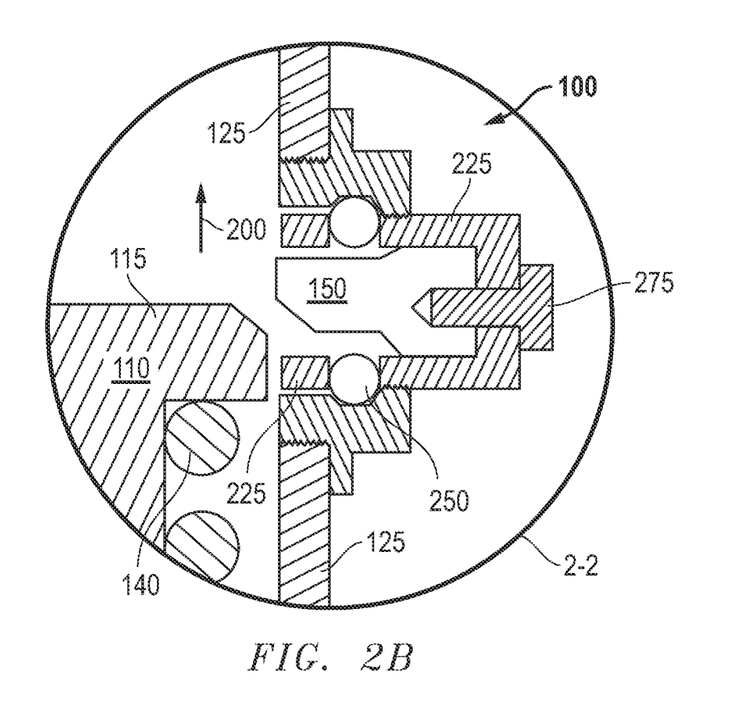
FIG. 2B is an enlarged view of the eutectic lock of the assembly taken from 2-2 of FIG. 1 with the lock disengaged by the non-axial load trigger.

Referring now to FIGS. 2A and 2B, enlarged views of the assembly 101 are illustrated taken from 2-2 of FIG. 1. Specifically, the FIG. 2A illustration depicts the lock 100 of the assembly 101 engaged and FIG. 2B depicts the lock 100 in a disengaged position. With specific reference to FIG. 2A, the above detailed extension 150 includes an inclined surface at the interface 155 of the piston 110 and head 115. With the extension 150 in place as illustrated, the axial vertical load of the spring 140 is incapable of forcing the piston 110 upward beyond the position shown.

In order to set the lock 100 as illustrated, the piston 110 may be manually depressed to the shown position. The lock 100 may be side mounted and coupled to the housing 125 at any number of pre-located threaded orifices about the circumference of the housing 125. Note the collar 260 of the depicted lock 100 is of a matching threading to support this coupling. Regardless, with the piston 110 compressing the spring 140 to the position shown and the lock 100 and extension 150 in place, the assembly 101 may be in a locked open position to support production flow. Indeed, a host of assemblies 101 may be positioned about this circumferential location of the housing 125 in this manner as indicated above.

In order to allow the spring 140 to lift the piston 110 and close off production flow, a rightward shift in position of the extension 150 may take place. This shift would result upon the elimination of the retainer 201. With the inclined interface 155, elimination of the retainer 201 would allow such a shift in the extension position with the piston 110 moving upward. In essence, the movement of the extension 150 would be horizontal in response to the vertical force of the spring 140. Thus, as suggested above, the extension 150 would be positionally responsive to the non-parallel, even perpendicular force of the spring 140. Further, the entirety of the load path, from spring 140 to retainer 201, is not reliant on threading, teeth or other discrete plurality of features to maintain integrity prior to retainer elimination. The retainer 201 is either structurally sound and the piston 110 held down as shown or a predetermined condition arises and the piston 110 is released.

Of course, in order for the noted shift in position of the extension 150 to occur, the retainer 201 is eliminated as indicated. Thus, for the embodiment shown, it is the retainer 201 that is constructed of eutectic material. Specifically, the retainer 201 is of a material that is selected to deteriorate in the face of the predetermined condition of extreme heat. This would stand to reason, given that the retainer 201 is to be employed at an oilfield surface near wellhead equipment (see FIG. 3).

For one embodiment, the eutectic implement, retainer 201 or otherwise, may be of a conventional eutectic alloy that is rated to maintain integrity at temperatures of up to about 150° F. The same retainer material may also be tailored to disintegrate upon reaching a sustained temperature of about 200° F. Thus, the emergence of a fire or other sustained extreme heat circumstance, should result in disintegration of the retainer 201 and shut off of the production flow in the vicinity of the region. In this regard, gallium, nickel and other conventional eutectic alloys may be utilized to derive a suitable alloy for comprising the retainer 201.

Referring now to FIG. 2B an enlarged view of the eutectic lock 100 taken from 2-2 of FIG. 1 is illustrated with the lock 100 disengaged by the non-axial load triggering described above. Specifically, the eutectic retainer 201 of FIG. 2A has been removed, for example, due to the emergent condition of extreme heat. Thus, the piston 110 is free to move in the upward direction (see arrow 200). More specifically, the disintegration of the retainer 201 means that the sloped interface 155 between the extension 150 and piston head 115 will result in a horizontal shift in the position of the extension 150 in response to the axial vertical load imparted by the spring 140. In other words, the lock 100 has been opened in response to a non-parallel, indeed substantially perpendicular load. Once more, for this particular embodiment, the eutectic implement of the retainer 201 avoids direct contact with any of the axial vertical load features.

As detailed above, the upward movement of the piston 110 may translate into the closing off of production flow at an oilfield 300 where the assembly 101 with the lock 100 is utilized (see FIG. 3). Continuing with reference to FIGS. 2A and 2B, the lock 100 further includes bearings 250 at a lock housing 225 which interfaces the noted collar 260. Thus, the shifting position of the extension 150 upon removal of the retainer 201 may be facilitated. Further, an end cap 275 is illustrated which supports initial assembly of the overall lock 100. Of course, a variety of other component features and lock embodiments may be utilized as further detailed below.

Referring now to FIG. 3, an overview of an oilfield 300 is shown at which the gate valve assembly 101 of FIG. 1 is utilized. Specifically, the assembly 101 is utilized to maintain control over production flow at a line 375 running from equipment 310 at a well 380. In the embodiment shown, the well 380 is defined by casing 387 and traversing various formation layers 385, 395 for collecting production fluid through a wellhead 350 at surface. Collected production fluid may be managed through a conventional tree and other equipment 310 and ultimately directed across a production line 375 as described above. As also noted above, such a surface setup may face a variety of hazards over the course of operations. The hazard of fire, in particular, could be catastrophic to equipment, personnel and the surrounding environment. Therefore, in order to mitigate the impact of such an occurrence, the gate valve assembly 101 is coupled to the line 375 at a hub 360 so that automatic shut-off may be achieved in such circumstances. Further, the overall design of the hub 360 and line 375 need not be limited in any meaningful way in terms of dimensions so as to accommodate an effective assembly 101. Instead, the assembly 101 is able to make use of unique eutectic lock embodiments that allow for larger and more flexible assemblies to be utilized in an effective manner.

Figure 4A:
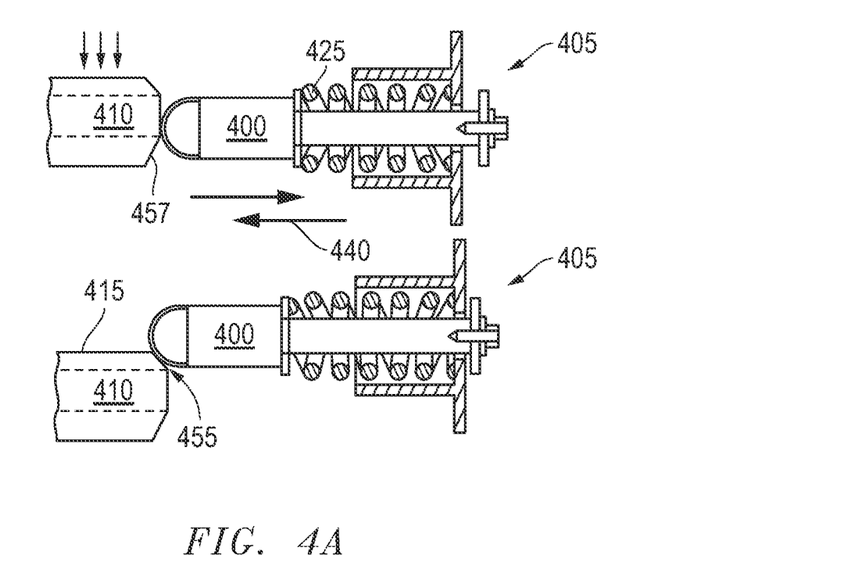
FIG. 4A is a side cross-sectional view of an alternate embodiment of a eutectic lock for a gate valve assembly in a locked position.
Figure 4B:
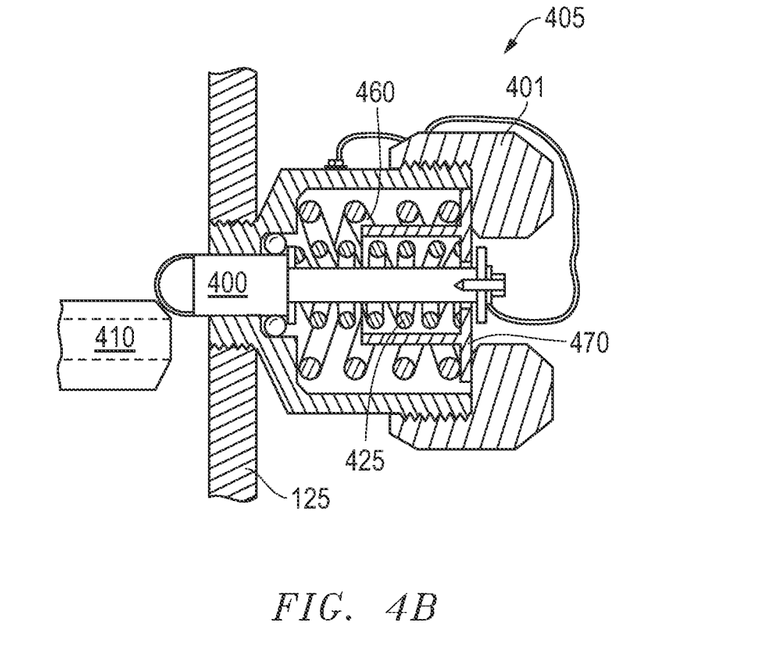
FIG. 4B is a side cross-sectional view of the eutectic lock of the gate valve assembly of FIG. 4A in an unlocked position, responding to a non-axial load trigger.

Referring now to FIGS. 4A and 4B, alternate embodiments of eutectic locks 405 are illustrated. More specifically, FIG. 4A is a side cross-sectional view of an alternate embodiment of a eutectic lock 405 being uniquely placed into a locked position. FIG. 4B is a side cross-sectional view of the same eutectic lock 405 with a eutectic implement in the form of a cap 401. Specifically, disintegration of this cap 401 would allow the lock 405 to achieve an unlocked position in response to a non-axial load trigger.

With specific reference to FIG. 4A, an extension 400 is illustrated for interfacing with the head 415 of a piston 410. However, for this embodiment, the extension 400 is configured for shifting both toward and away from the piston 410 as governed by a lock spring 425 (see arrows 440). Thus, rather than manually holding the piston 410 in a depressed position prior to affixing the lock 405 to the housing 125, the lock 405 may first be secured as shown in FIG. 4B.

With the lock secured as illustrated in FIG. 4B, the piston 410 may subsequently be forced downward. Interaction between a cap on the extension 400 and a lower inclined surface 457 of the piston head 415 may allow for the deflecting of the extension 400. Once past the vertical position of the extension 400, the head 415 may come to a secure stop with an interface 455 at the cap of the extension 400 and held safely in place by the lock spring 425. A lock 405 like this may be provided at multiple locations about a circumference location of the housing 125.

Of course, a failure mode through a eutectic implement is also built into the lock 405. Specifically, as illustrated at FIG. 4B, the implement is a lock cap 401 which securely holds a lock head 470 in place. Because the cap 401 is not in direct contact with the extension 400, the extension 400 may move back and forth as noted while allowing the cap 401 to remain structurally sound. Holding the lock head 470 in place as illustrated means that the extension 400 is also held in locking position by the lock spring 425. Of course, upon disintegration of the eutectic lock cap 401 under the right circumstances, an actuator spring 460, which is of greater effective load and force than the lock spring 425, is now able to force out the lock head 470. This movement of the lock head 470 away from the housing 125 means that the extension 400 would also move in such a direction, thereby releasing the piston 410 to move in an upward direction. In this manner, production may be closed off as detailed above.

Notice that the lock 405 again utilizes bearings to facilitate the extension's horizontal movements. Further, the cap of the extension may include a non-friction coating such as xylan to facilitate such horizontal movements during setting of the lock 405 as illustrated in FIG. 4A. As with other embodiments, these and other features may be incorporated into the lock architecture to facilitate the described functionality.

Figure 5:
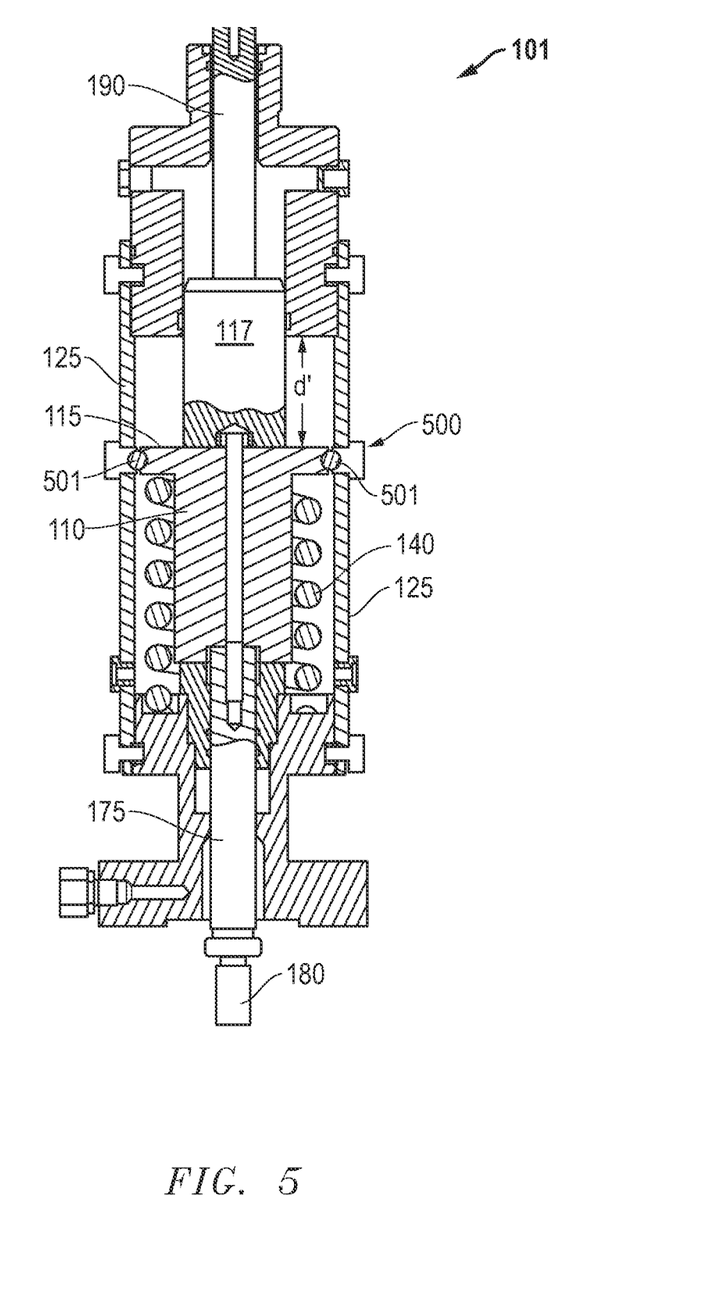
FIG. 5 is a side cross-sectional view of another embodiment of a gate valve assembly with a eutectic lock responsive to a non-axial load trigger.

Referring now to FIG. 5, another alternate embodiment of a eutectic lock 500 is illustrated. Specifically, a side cross-sectional view of a gate valve assembly 101 is shown with another eutectic lock 500 that is responsive to a non-axial load trigger. Unlike the embodiments described above, in this embodiment, the eutectic implement is one that makes direct contact with the vertical or axial load imparted through the piston 110. Specifically, the implement consists of eutectic bearings 501 that are distributed about circumferential locations of the housing 125 to keep the piston 110 locked in place as illustrated. In the depicted embodiment, two such locations are shown. However, any practical number of locations may be utilized. Regardless, while in direct contact with the axial vertical load path, the eutectic bearings 501 are spherical in nature. Thus, the load imparted may still be considered non-parallel to these features. More specifically, the load on the bearings 501 may be a radial load that is distributed in a radial manner. Therefore, in absence of disintegrating temperatures, the bearings 501 may be well suited for retaining the piston 110 as shown without undue stress that might render flexible assembly dimensions impractical as described above. Again, the absence of a directly parallel load on the eutectic implement has allowed for a more flexible assembly design.

Figure 6:
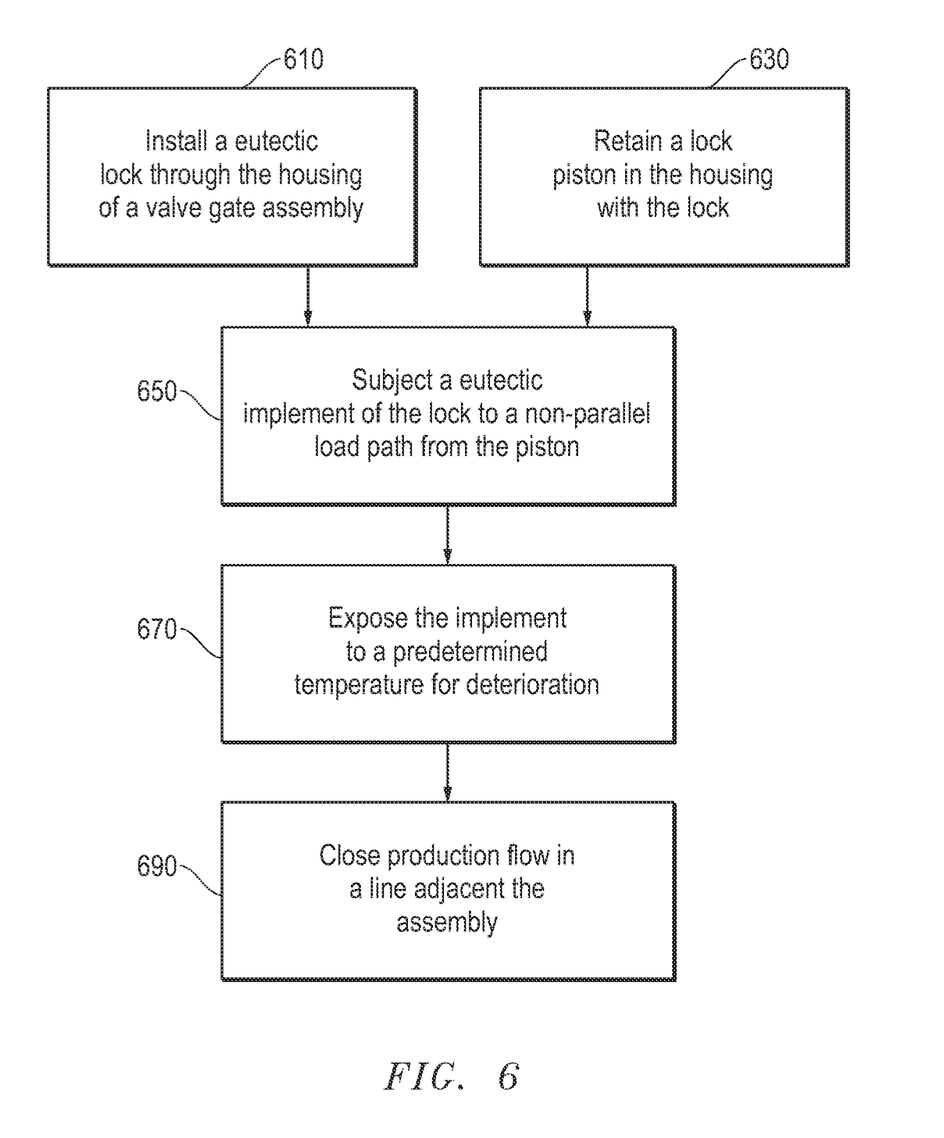
FIG. 6 is a flow-chart summarizing an embodiment of employing a gate valve assembly with a eutectic lock responsive to a non-axial load trigger at an oilfield production line.

Referring now to FIG. 6, a flow-chart is shown summarizing an embodiment of employing a gate valve assembly with a eutectic lock responsive to a non-axial load trigger at an oilfield production line. So, for example, a eutectic lock or several may be installed at a housing of such an assembly as indicated at 610. A piston within the housing may be retained by the lock as noted at 630. Further, as detailed above, it may be possible to install the lock in advance of locating the piston into locked position.

As shown at 650, once in position, the lock is subject to a non-parallel load path that emerges through the piston. For most embodiments discussed above, this path is energized by a spring that is substantial perpendicular in actuation compared to the orientation of a eutectic implement of the lock. This implement may be exposed to a predetermined temperature, for example, in emergent fire situations (see 670). Thus, a triggering of the lock to unlock and close off production flow at the assembly may occur as noted at 690.

Embodiments described hereinabove include valve gate assemblies that are unique in the utilization of a eutectic lock that is actuated by a non-parallel load path. This provides an added measure of control over tolerances. As a result, a wider variety of dimensions may be employed for associated valve gates and production lines. Thus, as a practical matter, efficient production need no longer be a casualty of safe gate valve regulation over production for sake of fire or high temperature occurrences.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A eutectic lock for retaining an actuator at a vertical position, the lock comprising:
   a lock housing;
   a lock head disposed in the lock housing;
   an extension disposed within the lock housing and the lock head, the extension including a first end engaged with the actuator in a locked position;
   a first biasing member biasing the extension to the locked position, the first biasing member disposed around the extension between the first end and the lock head;
   a second biasing member disposed around the first biasing member; and
   a eutectic implement coupled to the lock housing, wherein the second biasing member is configured to move the extension to an unlocked position to disengage the actuator after the eutectic implement fails in response to a disintegrating temperature.

2. The eutectic lock of claim 1, wherein the eutectic implement is adjacent the extension at an opposite side from the actuator.

3. The eutectic lock of claim 2, wherein the eutectic implement is a not in direct contact with the extension.

4. The eutectic lock of claim 1, wherein the disintegrating temperature is a temperature greater than 200° F.

5. The eutectic lock of claim 1, wherein the eutectic implement is external to the lock housing.

6. A valve assembly comprising:
a valve gate at a flowline for governance of a fluid flow through the flowline;
an actuator located within a housing adjacent the flowline and coupled to the valve gate, an axial position of the actuator controls a position of the valve gate to determine the governance of the fluid flow with the valve gate; and
a lock coupled to the housing, the lock including:
a eutectic cap;
an extension that in a locked position holds the actuator in a first position to allow the fluid flow through the flowline;
a first biasing member disposed around the extension biasing the extension to the locked position;
a second biasing member disposed around the first biasing member, wherein the second biasing member is configured to move the extension to an unlocked position upon a failure of the eutectic cap to release the actuator which moves to a second position to stop the fluid flow through the flowline.

7. The valve assembly of claim 6, wherein the actuator comprises (i) a spring to supply an axial load and (ii) a piston with a head configured to engage the extension in the locked position to support the holding of the actuator in the first position.

8. The valve assembly of claim 6, wherein the fluid is a production fluid from a well at one of a surface oilfield and a subsea oilfield.

9. The valve assembly of claim 6, wherein the valve assembly is a reverse acting gate valve assembly.

10. The valve assembly of claim 6, wherein the lock is installed through a side of the housing.

11. The valve assembly of claim 10, wherein the lock is one of a plurality of locks located at a circumferential location at the side of the housing.

12. The valve assembly of claim 11, wherein the locks are threaded to the housing at the circumferential side location thereof.

13. The valve assembly of claim 6, wherein the eutectic cap is external to a lock housing.

14. The valve assembly of claim 6, wherein the first biasing member is disposed between a lock head and a first end of the extension engaged with the actuator in the locked position.

15. A method of governing a flow of production fluid from a well with a gate valve assembly, the method comprising:
flowing the fluid through an orifice of a gate; and
holding the gate open during the flowing by retaining an actuator in a first position with an extension biased to a locked position by a first biasing member, wherein a second biasing member disposed around the first biasing member is configured to move the extension to an unlocked position after a eutectic implement deteriorates when exposed to an elevated temperature to allow the actuator to move to a second position to close the gate and stop the flowing of the fluid.

16. The method of claim 15, wherein the elevated temperature is greater than 200° F.

17. The method of claim 15, wherein the eutectic implement is structurally stable at temperatures of up to 150° F.

18. The method of claim 15, wherein the extension is an extension of a lock assembly, the method further comprising threading a plurality of lock assemblies through a sidewall of a housing of the actuator at a circumferential location thereof to support the retaining of the actuator.

19. The method of claim 15, further comprising manually positioning the actuator within a housing at a location adjacent the extension, the extension laterally movable during the positioning of the actuator while maintaining structural integrity of the eutectic implement.

20. The method of claim 19, wherein the extension is an extension of a lock assembly, the method further comprising installing a plurality of lock assemblies at a circumferential location of and through the housing in advance of manually positioning the actuator.

* * * * *